United States Patent
Masukawa et al.

(10) Patent No.: US 7,510,755 B2
(45) Date of Patent: Mar. 31, 2009

(54) HONEYCOMB STRUCTURE AND METHOD FOR PRODUCING SAME

(75) Inventors: Naoshi Masukawa, Nishikasugai-gun (JP); Shuichi Ichikawa, Handa (JP)

(73) Assignee: NGK Insulators, Ltd., Nagoya (JP)

( * ) Notice: Subject to any disclaimer, the term of this patent is extended or adjusted under 35 U.S.C. 154(b) by 338 days.

(21) Appl. No.: 10/564,977

(22) PCT Filed: Apr. 27, 2005

(86) PCT No.: PCT/JP2005/008049

§ 371 (c)(1),
(2), (4) Date: Jan. 18, 2006

(87) PCT Pub. No.: WO2005/105705

PCT Pub. Date: Nov. 10, 2005

(65) Prior Publication Data

US 2006/0228520 A1 Oct. 12, 2006

(30) Foreign Application Priority Data

Apr. 30, 2004 (JP) .............................. 2004-135229

(51) Int. Cl.
- B32B 3/12 (2006.01)
- B32B 3/26 (2006.01)
- B28B 3/26 (2006.01)
- C04B 35/10 (2006.01)
- C04B 35/14 (2006.01)
- C04B 35/00 (2006.01)
- B01D 39/06 (2006.01)
- B01D 46/00 (2006.01)

(52) U.S. Cl. .................. 428/116; 428/34.5; 428/304.4; 501/118; 501/119; 501/153; 501/154; 55/523; 55/529

(58) Field of Classification Search ................. 428/116, 428/117, 118, 119, 188, 913, 327, 73, 307.5, 428/34.5, 177, 304.4, 192; 501/118, 119, 501/120, 153, 154; 55/526, 585.3, 483, 502, 55/529; 264/177.12
See application file for complete search history.

(56) References Cited

U.S. PATENT DOCUMENTS

2004/0097370 A1  5/2004  Ichikawa et al.

(Continued)

FOREIGN PATENT DOCUMENTS

JP  A 2001-353976  12/2001

(Continued)

*Primary Examiner*—Jennifer McNeil
*Assistant Examiner*—Nicole T Gugliotta
(74) *Attorney, Agent, or Firm*—Oliff & Berridge, PLC

(57) ABSTRACT

There is provided a honeycomb structured body having improved durability in a honeycomb structure body obtained by unitarily bonding a plurality of honeycomb segments. There is provided a honeycomb structure body 1 including a plurality of honeycomb segments 12 each having an outer wall 7, partition walls 2 disposed in the outer wall 7, and a plurality of cells 3 separated from each other by the partition walls 2 and extending in an axial direction, a bonding layer 8 interposed between the plurality of honeycomb segments 12 to unitarily bond the honeycomb segments 12, and an intermediate layer 9 interposed between the bonding layer 8 and the honeycomb segments 9. In the honeycomb structure body 1, pores having a diameter of 0.5 μm or more of the intermediate layer 9 occupies 25% by volume or less of the whole volume of the intermediate layer 9.

8 Claims, 3 Drawing Sheets

U.S. PATENT DOCUMENTS

2005/0011174 A1 * 1/2005 Hong et al. .................... 55/523
2005/0079975 A1 * 4/2005 Fujita ......................... 502/439

FOREIGN PATENT DOCUMENTS

| JP | A 2003-155908 | 5/2003 |
| JP | A 2004-113887 | 4/2004 |
| WO | WO 03/048072 A1 | 6/2003 |

\* cited by examiner

HONEYCOMB STRUCTURE AND METHOD FOR PRODUCING SAME

TECHNICAL FIELD

The present invention relates to a honeycomb structure body where a plurality of honeycomb segments are unitarily bonded and a method for manufacturing the honeycomb structure body. In particular, the present invention relates to a honeycomb structure body suitably usable as a catalyst carrier, a filter, etc., for treating exhaust gas or the like, and a manufacturing method of the honeycomb structure body.

BACKGROUND ART

There has recently been used a honeycomb structure body as a catalyst carrier using a catalyst function of an internal combustion engine, a boiler, a chemical reactor, a reformer for a fuel battery, etc., or as a filter, or the like, for trapping particulate in exhaust gas, in particular, diesel particulate.

A honeycomb structure body used for such a purpose had a problem of generating cracks or the like in the structure body because of an uneven thermal distribution in the honeycomb structure due to a sudden temperature change of exhaust gas or local heating. In particular, in the case of being used as a filter for trapping particle-like substances in exhaust gas from a diesel engine (hereinbelow referred to as DPF), it was necessary to regenerate the filter by removing deposited carbon particles such as soot by combustion. Since a localized heating at high temperature was inevitable at this time, high thermal stress was liable to be generated, and cracks were easily formed.

Therefore, there was proposed a method for bonding segments, into which a honeycomb structure body was divided, with a bonding agent. However, in such a honeycomb structure, bonding force between the honeycomb segment and a bonding layer is not sufficient still now, and there was a case of having an adhesion defect such as exfoliation from the interface between them. To solve such a problem, there has been proposed to arrange an under layer or an intermediate layer between the honeycomb segment and the bonding layer in order to improve bonding force and relax stress at the interface (see Patent Document 1 and Patent Document 2).

Patent Document 1: JP-A-2003-159908
Patent Document 2: JP-A-2003-848072

DISCLOSURE OF THE INVENTION

The present invention is characterized by providing a honeycomb structure body having further improved durability in a honeycomb structure body obtained by unitarily bonding a plurality of honeycomb segments.

As a result of study to cope with the above problems, the following findings have been obtained. That is, in the case that a honeycomb structure body is used as a catalyst carrier, a DPF, or the like, a catalyst is loaded on partition walls using catalyst slurry, generally. It has been found, in that case, that the catalyst slurry permeates into the outer wall 7 toward the outer surface 72 of the outer wall 7 from the inner surface 7 thereof, only the solvent of the slurry further penetrates into the bonding layer 8, the catalyst is concentrated at the interface between the outer wall 7 and the bonding layer 8, and a catalyst layer 10 is formed under certain conditions as shown in FIG. 5. It has been also found that thermal stress is likely to be concentrated on the catalyst layer 10 because of high thermal expansion, and cracks are easily formed due to a heat shock. Further, it has been found that, since the catalyst layer 10 fails to show an effect as a catalyst because it has not contacted with fluid to be treated, this phenomenon results in the increase in the catalyst consumption and a rise in cost.

Then, it has been found that the disposition of an intermediate layer capable of suppressing permeation of a solvent between the outer wall and the bonding layer can prevent the concentration of a catalyst and the generation of cracks, and it further can reduce the cost. The present invention has been made based on the above findings and is directed to the provision of the following honeycomb structure body and manufacturing method of the honeycomb structure body.

[1] A honeycomb structure body comprising:
a plurality of honeycomb segments each having an outer wall, partition walls disposed in the outer wall, and a plurality of cells separated from each other by the partition walls and extending in an axial direction,
a bonding layer interposed between the plurality of honeycomb segments to unitarily bond the honeycomb segments, and
an intermediate layer interposed between the bonding layer and the honeycomb segments;
wherein pores having a diameter of 0.5 μm or more of the intermediate layer occupies 25% by volume or less of the whole volume of the intermediate layer.

[2] A honeycomb structure according to [1], wherein the intermediate layer contains 20% by mass of inorganic oxide.

[3] A honeycomb structure according to [1] or [2], wherein the intermediate layer contains a vitreous phase.

[4] A honeycomb structure according to [3], wherein chemical components of the vitreous phase include one or more kinds of alumina, silica, sodium, and potassium.

[5] A honeycomb structure body according to anyone of Claims [1] to [4], wherein predetermined cells are plugged.

[6] A honeycomb structure body according to any one of Claims [1] to [5], wherein a catalyst is carried.

[7] A method for manufacturing a honeycomb structure body by unitarily bonding, a plurality of honeycomb segments each having outer walls, partition walls disposed in the outer wall, and a plurality of cells separated from each other by the partition walls and extending in an axial direction,
wherein the method includes a step of disposing an intermediate layer material on an outer wall of the honeycomb segment, a step of disposing a bonding material between each of the honeycomb segments to unitarily bond the honeycomb segments, and a step of thermally treating the unitarily bonded honeycomb segments at 200 to 1200° C.

[8] A method for manufacturing a honeycomb structure body according to [7], wherein an intermediate layer having pores having a diameter of 0.5 μm or more occupying 25% by volume or less of the whole volume of the intermediate layer is formed.

Arranging an intermediate layer having less pores having large pore diameters can prevent the concentration of a catalyst at the interface between the outer wall and the bonding layer and improve durability of the honeycomb structure body.

BRIEF DESCRIPTION OF THE DRAWINGS

FIG. 1(*b*) is a schematic plan view showing an embodiment of a honeycomb structure body of the present invention.

Figure 1A:
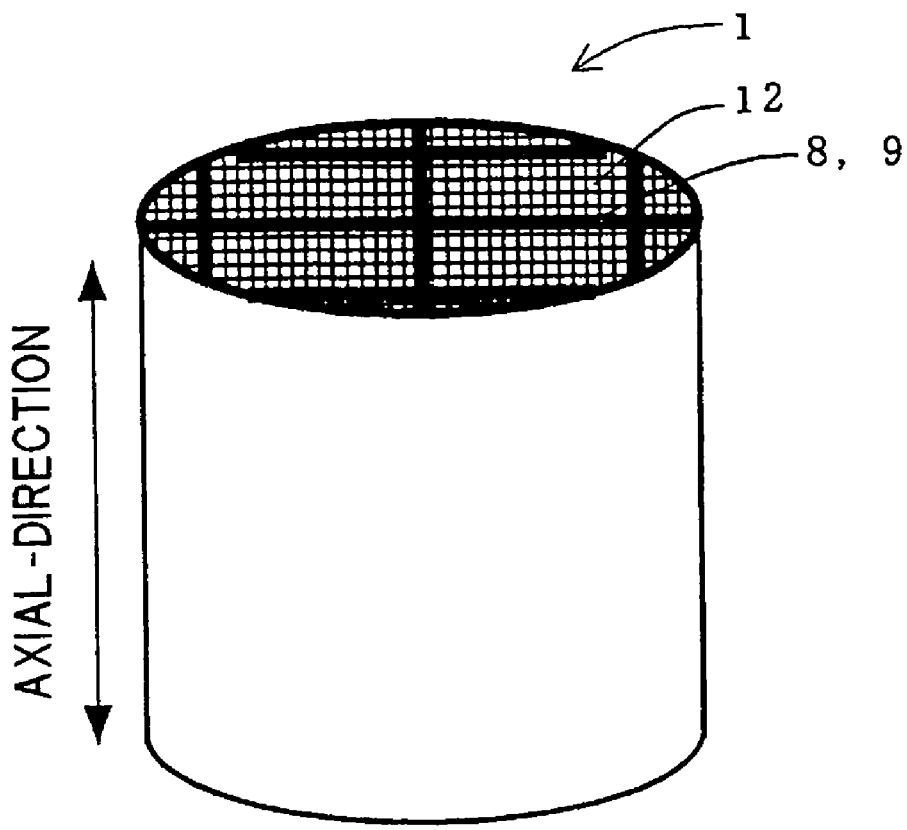
FIG. 1(*a*) is a schematic perspective view showing an embodiment of a honeycomb structure body of the present invention.

REFERENCE NUMERALS 1 honeycomb structure body
2 partition wall
3, 3a, 3b cell
7 outer wall
8 bonding layer
9 intermediate layer
10 catalyst layer
12 honeycomb segment
42 end face on inlet side
44 end face on outlet side
46, 48 end face
71 inner surface of outer wall
72 outer surface of outer wall

BEST MODE FOR CARRYING OUT THE INVENTION

Though embodiments of the present invention is hereinbelow described, the present invention is by no means limited to the following embodiments, and it should be understood that modification, improvement, or the like, of design may be added on the basis of common knowledge of those skilled in the art. Incidentally, a section described hereinbelow means a section perpendicular to a longitudinal direction (axial direction) of a cell unless otherwise specified.

Figure 1B:
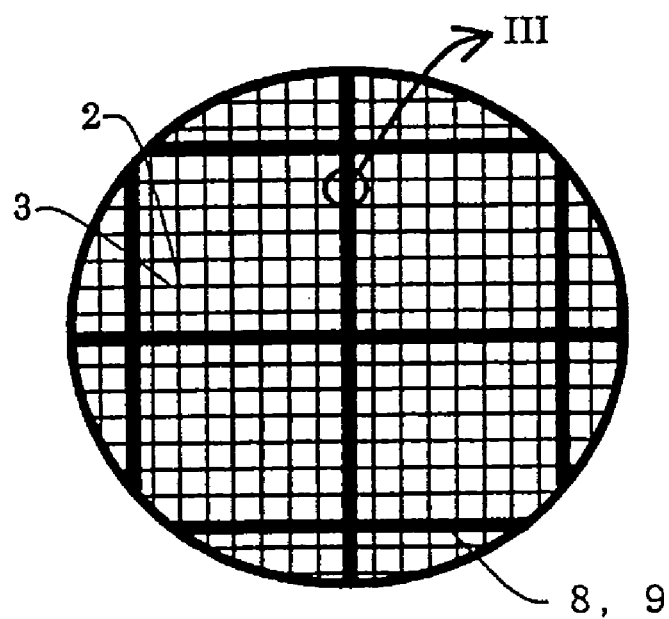
Figure 2:
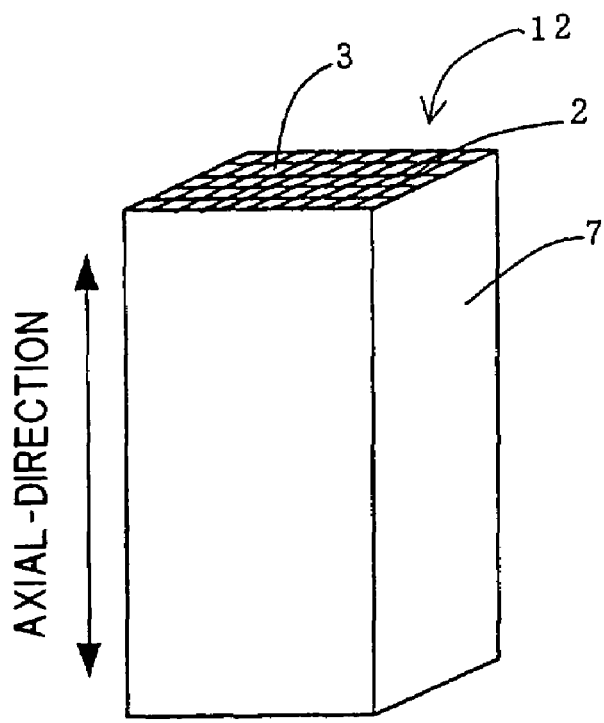
FIG. 2 is a schematic perspective view showing an embodiment of a honeycomb segment of the present invention.
Figure 3:
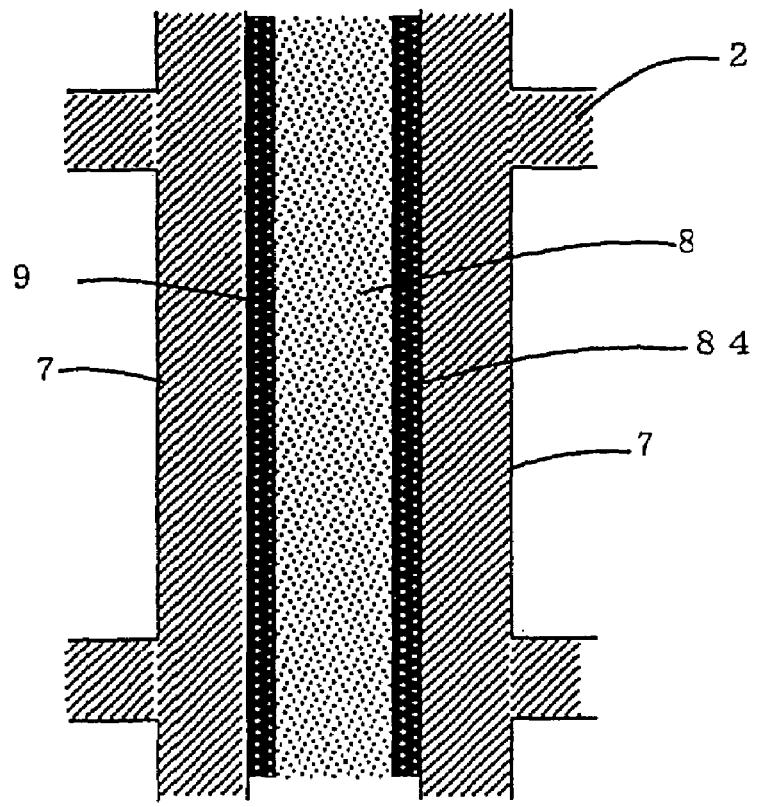
FIG. 3 is a schematic enlarged view of the III portion in FIG. 1(b).

FIGS. 1(a) and 1(b) are view showing an embodiment of a honeycomb structure body of the present invention. FIG. 1(a) is a schematic perspective view, and FIG. 1(b) is a schematic plan view. FIG. 2 is a schematic perspective view showing an embodiment of a honeycomb segment of the present invention. FIG. 3 is a schematic enlarged view of the III part in FIG. 1(b).

A honeycomb structure body shown in FIGS. 1(a), 1(b), FIG. 2, and FIG. 3 is provided with a plurality of honeycomb segments 12 each having an outer wall 7, partition walls 2 disposed in the outer wall 7, and a plurality of cells 3 separated from each other by the partition walls 2 and extending in an axial direction; a bonding layer 8 interposed between the plurality of honeycomb segments 12 to unitarily bond the honeycomb segments 12; and further an intermediate layer 9 interposed between the bonding layer 8 and the honeycomb segments 12. The plurality of honeycomb segments 12 are unitarily bonded via the bonding layer 8 and an intermediate layer 9.

Further, pores having a diameter of 0.5 µm or more of the intermediate layer occupies 25% by volume or less, preferably 10% by volume or less, and more preferably 5% by volume or less, of the whole volume of the intermediate layer. By making large-sized pores contained in the intermediate layer less, the intermediate layer 8 functions as a barrier layer and prevent catalyst solvent from permeating from the outer wall 7 to the bonding layer 8 upon loading a catalyst, hinders the concentration of the catalyst at the interface between the outer wall 7 and the bonding layer 8, and can prevent crack generation. Further, the cost can be reduced by reducing catalyst consumption. Incidentally, pore diameters and volume of pores in the present invention is based on a value measured by a mercury porosimeter.

Though there is no particular limitation on porosity of the intermediate layer 9, effect as a barrier layer is too small when the porosity is too high. The porosity of the intermediate layer 9 is preferably 40% or less, more preferably 30% or less, particularly preferably 20% or less. The porosity of the intermediate layer 9 is preferably lower than that of any of the outer wall 7 and the bonding layer 8 disposed on both sides of the intermediate layer 9.

It is preferably that the intermediate layer 9 is disposed so as to directly contact with the outer wall 7 because an effect as a barrier layer can be exhibited more effectively. Though the intermediate layer 9 is not necessarily required to be disposed on the whole outer surface 7 of the intermediate layer 9, it is preferable that the intermediate layer 9 is disposed on the whole outer surface 7 of the intermediate layer 9. It is also preferable that a part of the intermediate layer 9 invades into a part of the outer wall 7 from the viewpoint of imparting strength.

Though there is no particular limitation on thickness of the intermediate layer 9, effect as a barrier layer is lowered when it is too thin. The intermediate layer 9 has a thickness of preferably 5 µm or more, further preferably 10 µm or more, and particularly preferably 30 µm or more. Further, in view of a filter area, the maximum thickness of the intermediate layer 9 is preferably the thickness of the outer wall 7 or less.

Though there is no particular limitation on thermal expansion coefficient of the intermediate layer 9, it is not preferable that there is a large difference in thermal expansion coefficient between the outer wall 7 and the connecting layer 8 because high thermal stress is prone to generate at the interfaces. The difference in thermal expansion coefficient at 20 to 800° C. between the outer wall 7 and the intermediate layer 9 is preferably $8 \times 10^{-6}$/° C. or less, more preferably $4 \times 10^{-6}$/° C. or less. The difference in thermal expansion coefficient between the bonding layer 8 and the intermediate layer 9 is preferably $8 \times 10^{-6}$/° C. or less, further preferably $4 \times 10^{-6}$/° C. or less.

There is no particular limitation on material and composition of the intermediate layer 9, and any material and composition capable of reducing large-sized pores may be selected. From this view point, it is preferable that the intermediate layer 9 contains a vitreous phase. Examples of a preferable vitreous phase include vitreous phase formed from potassium silicate, sodium silicate, borosilicate glass, frit, various kinds of sol, and various kinds of gel; and a vitreous phase formed from at least one of these is preferable. Among these, a vitreous phase formed from at least one of potassium silicate and sodium silicate is preferable from the viewpoint of cost and handleability. As a chemical component, it is preferable that at least one kind selected from alumina, silica, sodium, and potassium is contained. It is preferable that 10% by mass or more of the intermediate layer has a vitreous phase. Incidentally, a "vitreous phase" in the present invention means the thing that can be confirmed as halo by X-ray diffraction analysis.

It is also preferable that inorganic aggregate is contained in the intermediate layer 9 in order to adjust the thermal expansion coefficient of the intermediate layer 9. Examples of the preferable aggregate include silicon carbide, alumina, metal silicon, zirconium phosphate, aluminum titanate, and titania, and it is preferable that at least one kind of these is contained. The content of aggregate is preferably 0.1 to 80% by mass, more preferably 0.1 to 50% by mass, and particularly preferably 0.1 to 30% by mass.

In addition, it is preferable that the intermediate layer 9 has good bonding force with the bonding layer 8. From this viewpoint, it is preferable that the intermediate layer 9 contains an inorganic oxide. The inorganic oxide is contained preferably by 20% by mass or more, further preferably by 50% by mass or more, and particularly preferably by 70% by mass or more. Examples of the preferable inorganic oxide include silica, alumina, titania, and mullite, and it is preferable that at least one kind of these materials is contained. Incidentally, the inorganic oxide may have a vitreous phase or may be in the form of an aggregate. Alternatively, the intermediate layer 9 may contain an inorganic oxide as a crystal phase besides the glass layer and the aggregate.

The bonding layer 8 preferably has a relatively low thermal expansion coefficient since cracks is easily formed due to thermal stress when the thermal expansion coefficient is too high. The thermal expansion coefficient at 20 to 800° C. of the bonding layer is preferably within the range from $1\times10^{-6}/°$ C. to $8\times10^{-6}/°$ C., more preferably $1.5\times10^{-6}/°$ C. to $7\times10^{-6}/°$ C., particularly preferably $2.0\times10^{-6}/°$ C. to $6\times10^{-6}/°$ C.

There is no particular limitation on thickness of the bonding layer 8. When it is too thick, pressure loss increases when fluid to be treated passes through the honeycomb structure body, and temperature becomes uneven in the honeycomb structure body upon regenerating by burning soot in the case of using the honeycomb structure body as a DPF, and thereby regeneration efficiency is lowered, and cracks are prone to be caused due to high thermal stress, which are not preferable. When the bonding layer 8 is too thin, it lowers effect in release thermal stress of the honeycomb segments as a base material to the bonding layer upon practical use of the honeycomb structure body, and therefore cracks are sometimes caused in the base material. The thickness of the bonding layer 8 is preferably 0.1 to 3.0 mm, and more preferably 0.5 to 2.0 mm.

The bonding layer 8 preferably contains inorganic matter as the main component and preferably formed from raw material containing one or more kinds of colloidal sol such as silica sol and alumina sol; one or more kinds of ceramic selected from the group consisting of silicon carbide, silicon nitride, cordierite, alumina, mullite, zirconia, zirconium phosphate, aluminum titanate, titania, and a combination thereof, Fe—Cr—Al based metal, nickel based metal, an inorganic powder of metal Si and SiC, or the like; one or more kinds of inorganic fibers such as ceramic fibers; inorganic binder; and the like.

Colloidal sol is suitable for imparting bonding force. An inorganic powder is suitable for improving affinity of the outer wall of the honeycomb segments, and an inorganic powder having a thermal expansion close to that of the main component of the honeycomb segments is preferable. In addition, inorganic fibers are suitable as a reinforcing material for suitably imparting tenacity to the bonding layer.

Though various ceramics of oxide or non-oxide can be considered as the main component of the honeycomb segment 12, it is preferably formed from at least one material selected from the group consisting of cordierite, mullite, alumina, spinel, silicon carbide, silicon carbide-cordierite based composite material, silicon-silicon carbide based composite material, silicon nitride, lithium aluminum silicate, aluminum titanate, Fe—Cr—Al based metal, and a combination thereof from the viewpoint of strength, thermal resistance, etc. Silicon carbide or silicon-silicon carbide composite material is suitable in point of thermal conductivity and thermal resistance, and cordierite is suitable in point of low thermal expansion. Here, the "main component" means the component constituting 50% by mass or more, preferably 70% by mass or more, more preferably 80% by mass or more, of the honeycomb segment.

In addition, in the case that the honeycomb segment 12 contains, as the main component, a composite material of metal silicon (Si) and silicon carbide (SiC), it is difficult to obtain an effect of adding Si when the Si content determined by Si/(Si+SiC) of the honeycomb segment is too small, and it is difficult to obtain an effect of thermal resistance and high thermal conductivity, which are characteristics of SiC, when it is above 50% by mass. Therefore, the content of Si is preferably 5 to 50% by mass, and more preferably 10 to 40% by mass.

The partition walls 2 and the outer wall 7 of the honeycomb segment 12 are preferably porous bodies capable of playing a role of a filter and/or a catalyst carrier. The problem of crack generation due to the concentration of the catalyst at the interface as described above tends to be found often in a honeycomb structure body having high porosity. Therefore, in a honeycomb structure body having high porosity, effect of the present invention is particularly remarkable. By this, it is particularly preferable to apply the present invention to a honeycomb structure body having high pore diameter. However, when the porosity is too high, it is not preferable because strength as a honeycomb structure body is lowered too much. Therefore, the present invention is preferably be applied to a honeycomb structure having the partition wall 2 and the outer wall 7 both having a porosity of 40 to 75%, further 50 to 70%.

Though there is no particular limitation on thickness of the partition wall 2 and the outer wall 7, pressure loss is too large when fluid to be treated passes through the honeycomb structure body in the case that the partition wall 2 and the outer wall 7 are too thick, and strength is insufficient in the case that the partition wall and the outer wall is too thin; neither of them is preferable. Thickness of the partition wall is preferably 30 to 2000 µm, further preferably 40 to 1000 µm, and most preferably 50 to 500 µm. Thickness of the outer wall is preferably 45 to 3000 µm, further preferably 60 to 1500 µm, and most preferably 75 to 750 µm.

Though there is no particular limitation on cell density (the number of cells per unit sectional area) of the honeycomb segment 12, strength and effective GSA (geographic surface area) of the honeycomb structure body is insufficient in the case that the cell density is too low, and pressure loss is too large when the fluid to be treated in the case that the cell density is too high. The cell density is preferably 6 to 2000 cells/inch$^2$ (0.9 to 311 cell/cm$^2$), further preferably 50 to 1000 cells/inch$^2$ (7.8 to 155 cell/cm$^2$), and most preferably 100 to 400 cells/inch$^2$ (15.5 to 62.0 cell/cm$^2$). Though there is no particular limitation to sectional shapes of the cells (cell shapes), the shape is preferably rectangular, triangular, hexagonal, or corrugated from the viewpoint of production.

Though there is no particular limitation on size of the honeycomb segments 12, the problem of breakage due to thermal stress is caused in the case that each segment is too large, and production and unitarily bonding of the honeycomb segments 12 becomes complicated in the case that each segment is too small; neither of them is preferable. The section size of the honeycomb segments is preferably 900 to 10000 mm$^2$, further preferably 900 to 5000 mm$^2$, and most preferably 900 to 3600 mm$^2$. It is preferable that 70% by volume or more of the honeycomb structure body is constituted by the honeycomb segments of a size in the above ranges. Though there is no particular limitation on shape of the honeycomb segments, for example, honeycomb segments each having a rectangular sectional shape as shown in FIG. 2, that is, a square prism is a basic shape, and the shape of the honeycomb segment on the outer peripheral side can suitably be selected according to the shape of the honeycomb structure body in the case of unitarily bonding as shown in FIGS. 1(a) and 1(b).

There is no particular limitation on a sectional shape of the honeycomb structure body 1, and the shape may be, for example, an oval; a race-track shape; an ellipse; a polygonal shape such as a triangle, almost a triangle, a square, almost and a square; and different shapes; besides the circular shape as shown in FIG. 1(b)

Figure 4A:
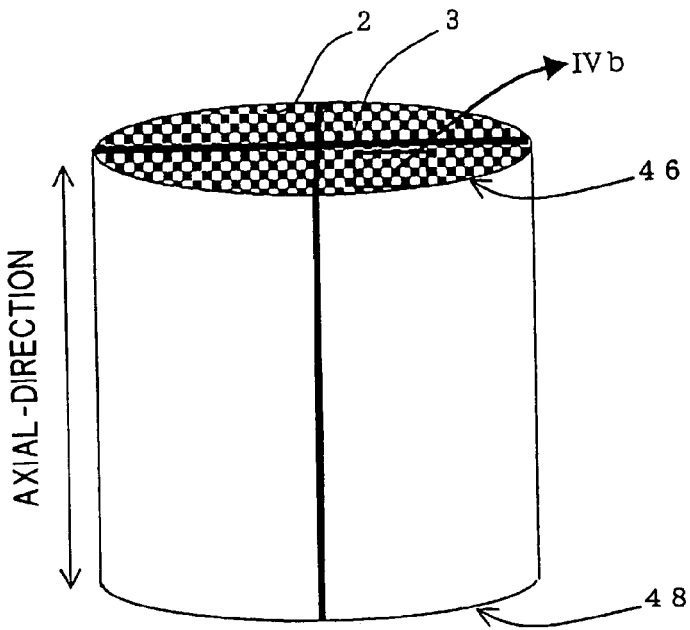
FIG. 4(a) is a schematic perspective view showing another embodiment of a honeycomb structure body of the present invention.
Figure 4B:
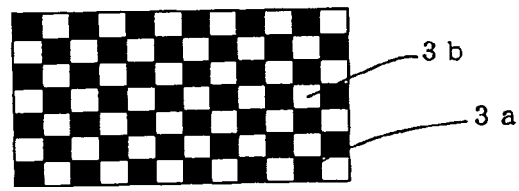
FIG. 4(b) is a schematic enlarged view of the IVb portion in FIG. 4(a).
Figure 5:
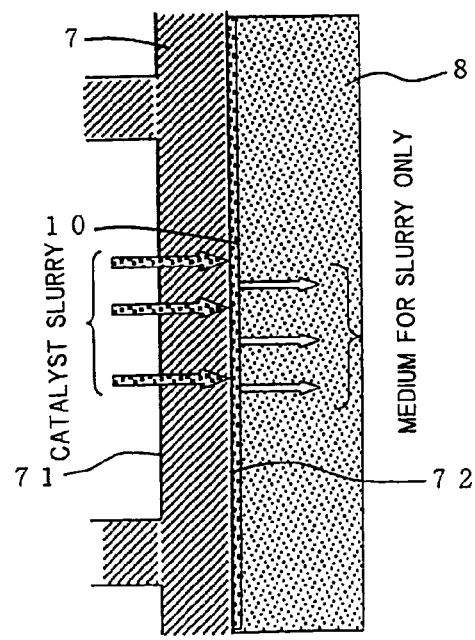
FIG. 5 is a schematic enlarged view showing a part of a conventional honeycomb structure body.

In the case of particularly using a honeycomb structure 1 as a DPF, it is preferable that an opening portion of each of the predetermined cells 3a is plugged at one end face 46 and an opening portion of each of the other predetermined cells 3b is plugged at the other end face 48 as shown in FIGS. 4(a) and 4(b). In particular, as shown in FIGS. 4(a) and 4(b), it is preferable that cells 3 are alternately plugged in such a manner that the end faces 46 and 48 show a checkerwise pattern. By the plugging in such a manner, for example, fluid to be treated flows in from the end face 46, passes through the partition walls 2, and is discharged from the other end face 48. The partition wall 2 serves as a filter when the fluid passes through the partition wall 2, and the aimed substances can be removed.

There can suitably be used, as a material used for plugging, one or more kinds of materials selected from the ceramics and metals described above as those suitably usable for the segment.

In the case of using the honeycomb structure body 1 as a catalyst carrier for purification of exhaust gas from a thermal engine such as an internal combustion engine or a combustion apparatus such as a boiler or for reformation of liquid fuel or gaseous fuel, or as a DPF for facilitating combustion and removal of carbon particles in the filter, it is preferable to load a carrier, for example, metal having catalytic ability on the honeycomb structure 1. Examples of the catalyst include Pt, Pd, and Rh, and among them, at least one kind is preferably loaded on the honeycomb structure body. It is also preferable that a promoter represented by an oxide of cerium (Ce) or zirconium (Zr) is loaded on the honeycomb structure body 1.

An embodiment of a method for manufacturing a honeycomb structure body will hereinbelow be described. In the embodiment, a honeycomb segment 12 is prepared in the first place. The honeycomb segment 12 can be produced by, for example, the following process.

Plastic body is produced by, for example, mixing a binder such as methyl cellulose and hydroxypropoxylmethyl cellulose, a surfactant, water, and the like with, for example, at least one kind of ceramic selected from the group consisting of silicon carbide, silicon nitride, cordierite, alumina, mullite, Zirconia, zirconium phosphate, aluminum titanate, titania, and a combination thereof; Fe—Cr—Al based metal; nickel based metal; or a particle substance of metal Si and SiC, and the like, to obtain a mixture and kneading the mixture.

The plastic body is subjected to, for example, extrusion forming to form a honeycomb formed body having a plurality of cells separated from each other by partition walls and extending in an axial direction. This is dried by, for example, microwaves and hot air, and then fired to produce a honeycomb segment 12 as shown in FIG. 2. It is possible to impart a preferable shape described in the above first invention to a honeycomb segment 12 produced here.

Next, an intermediate layer material is disposed on the outer wall 7 of the honeycomb segment 12. The intermediate layer material preferably contains a component for forming the intermediate layer and other components such as solvent and particularly preferably in the form of slurry. In addition, the intermediate layer material preferably contains a component for forming a vitreous phase. The intermediate layer material containing a component for forming a vitreous phase makes minimization of pore diameter of the intermediate layer to be formed and reduction in porosity easy. A preferable component for forming a vitreous phase preferably contains at least one of alumina, silica, sodium, and potassium. Examples of a material used upon forming a vitreous phase include potassium silicate, sodium silicate, borosilicate glass, frit, various kinds of sol, and various kinds of gel. It is preferable that at least one of them is contained. It is preferable that 10% by mass of the components forming the intermediate layer is a component for forming a vitreous phase.

It is also preferable that the intermediate layer material contains inorganic particles for forming an aggregate. Example of the preferable inorganic particles include silicon carbide, alumina, metal silicon, cordierite, mullite, silicon nitride, zirconia, zirconium phosphate, aluminum titanate, and titania, and at least one of them is preferably contained. The content of the inorganic particles is preferably 0.1 to 80% by mass, further preferably 0.1 to 50% by mass, and particularly preferably 0.1 to 30% by mass of the components forming the intermediate layer.

It is also preferable that the intermediate layer material contains silicone resin, organic complex having an organic salt containing a carboxyl group or an amino group because pore diameter of the intermediate layer can be reduced and porosity can be reduced easily. By using the organic matter as a raw material in a condition of a liquid phase, a dense structure can be imparted to the intermediate layer.

The intermediate layer material preferably contains an inorganic oxide. The inorganic oxide is contained by preferably 20% by mass or more, further preferably 50% by mass or more, and particularly preferably 70% by mass or more of the components forming the intermediate layer. Examples of the preferable inorganic oxide include silica, alumina, titania, and mullite, and it is preferable that at least one of them is contained. Incidentally, the inorganic oxide may be a component forming a grass phase or inorganic particles for forming an aggregate. Alternatively, the intermediate layer material may contain an inorganic oxide other than these.

There is no particular limitation on a method for disposing the intermediate layer material, and it can be disposed by spraying, brushing, roller coating, dipping, or the like.

Next, the honeycomb segments are unitarily bonded by disposing a bonding material between the honeycomb segments. Though there is no limitation on a component for a bonding material, it preferably contains one or more kinds of colloidal sol such as silica sol and alumina sol; one or more kinds of ceramic selected from a group consisting of silicon carbide, silicon nitride, cordierite, alumina, mullite, zirconia, zirconium phosphate, aluminum titanate, titania, and a combination thereof, Fe—Cr—Al based metal, nickel based metal and an organic powder of metal Si and SiC, and the like; an inorganic binder; and the like. The bonding material may further contain an organic binder such as methyl cellulose, ethyl cellulose, polyvinyl alcohol, and hydroxypropoxylmethyl cellulose; and the like. The bonding material also can be disposed in a manner similar to that of the intermediate layer material. It is preferable that the bonding material is also in the form of slurry.

It is preferable that, after the intermediate layer material is applied, the bonding material is applied on the intermediate layer material. In the case of applying the intermediate layer material only on one side wall 7, the bonding material may be applied directly on the other side wall 7. In this case, the intermediate layer material and the bonding material may be applied in arbitrary order.

Next, the honeycomb segments are unitarily bonded. After that, the unitarily bonded honeycomb segments are subjected to a thermal treatment at 200 to 1200° C. By this thermal treatment, a bonded organization of an inorganic oxide is formed inside the intermediate layer, pore diameter of the intermediate layer is reduced, porosity is reduced, and strength can be imparted to the intermediate layer. Temperature for the thermal treatment is further preferably 500 to 1000° C., and particularly preferably 600 to 800° C. Time for the thermal treatment is preferably 10 to 180 minutes, and more preferably 20 to 120 minutes.

In the case that a honeycomb structure body is used as a filter, particularly a DPF, or the like, it is preferable that openings of the cells 3 are alternately plugged by a plugging member, and it is further preferably that plugging is performed alternately to form a checkerwise pattern at each end face. The plugging can be performed by masking cells not to be plugged, applying a slurried raw material on each of the opening end faces of a honeycomb segment, drying, and firing. In this case, it is preferable that plugging is performed during the above manufacturing process of the honeycomb segment, that is, after forming the honeycomb segment and before firing because only one firing step is required. However, plugging may be performed after firing, and plugging may be performed in any step as long as it is after the forming step. Though material for the plugging member can suitably be selected from the group described above as preferable raw materials for the honeycomb segment, it is preferable to use the same raw material as that for the honeycomb segment.

In addition, a catalyst can be loaded on the honeycomb structure body by a know method generally performed by those skilled in the art, and a catalyst may be loaded by, for example, wash coating catalyst slurry, drying, and firing.

EXAMPLES

The present invention is hereinbelow described in more detail on the basis of Examples. However, the present invention is by no means limited to these Examples.

(Production of Honeycomb Segment)

As raw material, SiC powder and metal Si powder was mixed together at a mass ratio of 80:20 to give a mixture. To the mixture were further added starch and foaming resin as pore-forming material, methyl cellulose, hydroxypropoxylmethyl cellulose, a surfactant, and water to prepare plastic body. The plastic body was subjected to extrusion forming and dried with microwaves and hot air to obtain honeycomb segments each having a partition wall thickness of 310 μm, a cell density of about 46.5 cells/cm$^2$ (300 cells/inch$^2$), a square section with a side length of 35 mm, and a length of 152 mm. Next, cells were plugged alternately at each end face with the same material as that used in production of the honeycomb filter in such a manner that each end portion has a checkerwise pattern, and the segments were dried, degreased at about 400° C. in an ambient atmosphere, and fired at about 1450° C. in an Ar inert atmosphere to obtain Si-bonded SiC honeycomb segments.

SiC powder as inorganic particles, aluminosilicate based fibers as organic fibers, silica sol aqueous solution as colloidal oxides and clay were mixed together to give a mixture. Water was added to the mixture, and the mixture was kneaded with a mixer for 30 minutes to obtain a bonding material.

On the other hand, raw materials shown in Table 1 were mixed with the compositions shown in Table 1 to give each mixture, which was stirred with a mixer for 10 minutes to give each intermediate layer material. Incidentally, there was used SiC1 having a mean diameter of 2 μm and SiC2 having a mean diameter of 10 μm in Table 1.

After the intermediate layer material shown in Table 1 was applied on the outer surface 4 of each honeycomb segment with a roller, the bonding material was applied thereon, and 16 honeycomb segments are bonded to give a rectangular parallelepiped. This was machined to give a cylindrical shape having a diameter of 143 mm, and after the outer periphery was coated with a bonding material, a thermal treatment was performed at 700° C. to give honeycomb structure bodies having intermediate layers of different characteristics. Catalyst was loaded on these honeycomb structure bodies by wash-coating catalyst slurry on these honeycomb structures and baking, and then each of the honeycomb structure bodies was attached in an exhaust pipe of a diesel engine, and a critical soot amount was measured. Incidentally, in this measurement, after soot was combusted at the step where a predetermined amount of soot is accumulated on the honeycomb structure body, the honeycomb structure body was observed. The soot amount was increased by stages. An accumulated soot amount when a crack was observed in the honeycomb structure body was determined as the critical soot amount. The results are shown in Table 2.

TABLE 1

| Intermediate layer material No. | SiC1 (mass %) | SiC2 (mass %) | Potassium silicate 30% aqueous solution (mass %) | Water (mass %) |
|---|---|---|---|---|
| 1 | 0 | 0 | 100 | 0 |
| 2 | 20 | 0 | 75 | 5 |
| 3 | 40 | 0 | 45 | 15 |
| 4 | 50 | 0 | 25 | 25 |
| 5 | 0 | 20 | 75 | 5 |
| 6 | 0 | 40 | 45 | 15 |

TABLE 2

| Honeycomb structure body No. | Intermediate layer material No. | Volume of pores of 0.5 μm or more (vol. %) | Amount of inorganic oxide (mass %) | Critical soot amount (g/L) |
|---|---|---|---|---|
| Exam. 1 | 1 | 1 | 5 | 100 | 11 |
| Exam. 2 | 2 | 2 | 9 | 53 | 11 |
| Exam. 3 | 3 | 3 | 15 | 25 | 10 |
| Exam. 4 | 4 | 4 | 23 | 13 | 8 |
| Comp. Exam. 1 | 5 | 5 | 30 | 53 | 7 |
| Comp. Exam. 2 | 6 | 6 | 40 | 25 | 6 |
| Comp. Exam. 3 | 7 | None | — | — | 5 |

It is understood from Table 2 that, in each of the honeycomb structure bodies in Examples 1 to 4, where a volume of pores having a diameter of 0.5 μm or more in the intermediate layer is 25% or less with respect to the whole volume of the intermediate layer, durability was improved with showing a large critical soot amount in comparison with the honeycomb structure bodies of Comparative Examples 1 to 3, where a volume of pores having a diameter of 0.5 μm or more in the intermediate layer is above 25%. In honeycomb structure bodies of Examples 1 to 3, where an amount of inorganic oxide in the intermediate layer is 20% by mass or more, the critical soot amount was further improved in comparison with the honeycomb structure body in Example 4, where an amount of inorganic oxide is below 20% by mass. This seems to be because bonding force between the intermediate layer and the bonding material layer was improved by the inorganic oxide at a predetermined amount or more and durability of the honeycomb structure body was further improved.

INDUSTRIAL APPLICABILITY

As described above, a honeycomb structure body of the present invention is excellent in durability and can suitably be used as a filter such as a DPF, a catalyst carrier, or the like. In particular, it can suitably be used as a DPF.

The invention claimed is:

1. A honeycomb structure body comprising:
   a plurality of honeycomb segments each having an outer wall, partition walls disposed in the outer wall, and a plurality of cells separated from each other by the partition walls and extending in an axial direction,
   a bonding layer interposed between the plurality of honeycomb segments to unitarily bond the honeycomb segments, and
   an intermediate layer interposed between the bonding layer and the honeycomb segments;
   wherein pores having a diameter of 0.5 µm or more of the intermediate layer occupies 25% by volume or less of the whole volume of the intermediate layer.

2. A honeycomb structure according to claim 1, wherein the intermediate layer contains 20% by mass of inorganic oxide.

3. A honeycomb structure according to claim 1, wherein the intermediate layer contains a vitreous phase.

4. A honeycomb structure according to claim 3, wherein chemical components of the vitreous phase include one or more kinds of alumina, silica, sodium, and potassium.

5. A honeycomb structure body according to claim 1, wherein predetermined cells are plugged.

6. A honeycomb structure body according to claim 1, wherein a catalyst is carried.

7. A honeycomb structure according to claim 2, wherein the intermediate layer contains a vitreous phase.

8. A honeycomb structure body according to claim 2, wherein predetermined cells are plugged.

* * * * *